(12) United States Patent
Sung et al.

(10) Patent No.: US 12,140,063 B2
(45) Date of Patent: Nov. 12, 2024

(54) EXHAUST TREATMENT SYSTEM FOR DUAL FUEL ENGINES

(71) Applicant: BASF MOBILE EMISSIONS CATALYSTS LLC, Iselin, NJ (US)

(72) Inventors: Shiang Sung, Iselin, NJ (US); Pushkaraj R Patwardhan, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 18/000,295

(22) PCT Filed: Jun. 15, 2021

(86) PCT No.: PCT/US2021/037413
§ 371 (c)(1),
(2) Date: Nov. 30, 2022

(87) PCT Pub. No.: WO2021/257549
PCT Pub. Date: Dec. 23, 2021

(65) Prior Publication Data
US 2023/0287822 A1    Sep. 14, 2023

Related U.S. Application Data

(60) Provisional application No. 63/039,633, filed on Jun. 16, 2020.

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01D 53/944* (2013.01);
(Continued)

(58) Field of Classification Search
CPC .... B01D 2251/2062; B01D 2255/1021; B01D 2255/1023; B01D 2255/2042;
(Continued)

(56) References Cited

U.S. PATENT DOCUMENTS 5,845,485 A * 12/1998 Murphy ................ F01N 3/2006
60/284
6,122,909 A * 9/2000 Murphy ................ F01N 3/2046
60/275
(Continued)

FOREIGN PATENT DOCUMENTS

KR    10-1998-0085169 A    12/1998
WO    WO-2018/185665 A1    10/2018

OTHER PUBLICATIONS

International Search Report dated Sep. 27, 2021, PCT/US2021/037413.
(Continued)

*Primary Examiner* — Jesse S Bogue
(74) *Attorney, Agent, or Firm* — DLA Piper LLP (US)

(57) ABSTRACT

Disclosed herein are emission treatment systems comprising an oxidation catalyst composition in fluid communication with an exhaust gas stream emitted from an engine that combusts both hydrocarbon fuel and hydrogen; and optionally, at least one selective catalytic reduction (SCR) composition and/or at least one three-way conversion (TWC) catalyst composition, combustion systems comprising the same, and method of treating an exhaust gas stream, such as, e.g., an exhaust gas produced by combusting hydrogen fuel during a cold-start period, using the same.

35 Claims, 9 Drawing Sheets

(51) Int. Cl.
*B01J 21/04* (2006.01)
*B01J 23/58* (2006.01)
*B01J 23/656* (2006.01)
*B01J 29/76* (2006.01)
*B01J 29/78* (2006.01)
*B01J 35/00* (2006.01)
*B01J 35/56* (2024.01)
*F01N 3/10* (2006.01)
*F01N 3/28* (2006.01)
*F01N 13/00* (2010.01)
*F02B 43/10* (2006.01)
*F02M 27/04* (2006.01)

(52) U.S. Cl.
CPC ....... *B01D 53/945* (2013.01); *B01D 53/9477* (2013.01); *B01J 21/04* (2013.01); *B01J 23/58* (2013.01); *B01J 23/6562* (2013.01); *B01J 29/763* (2013.01); *B01J 29/7815* (2013.01); *B01J 35/19* (2024.01); *B01J 35/56* (2024.01); *F01N 3/101* (2013.01); *F01N 3/106* (2013.01); *F01N 3/2828* (2013.01); *F01N 13/009* (2014.06); *F02B 43/10* (2013.01); *F02M 27/04* (2013.01); *B01D 2251/2062* (2013.01); *B01D 2255/1021* (2013.01); *B01D 2255/1023* (2013.01); *B01D 2255/2042* (2013.01); *B01D 2255/2073* (2013.01); *B01D 2255/20761* (2013.01); *B01D 2255/502* (2013.01); *B01D 2255/9155* (2013.01); *B01D 2258/012* (2013.01); *B01D 2258/018* (2013.01); *F01N 2330/06* (2013.01); *F01N 2370/04* (2013.01); *F01N 2610/02* (2013.01); *F01N 2610/1453* (2013.01); *F02B 2043/103* (2013.01); *F02B 2043/106* (2013.01)

(58) Field of Classification Search
CPC .. B01D 2255/2073; B01D 2255/20761; B01D 2255/502; B01D 2255/9155; B01D 2258/012; B01D 2258/018; B01D 53/9418; B01D 53/944; B01D 53/945; B01D 53/9477; B01J 21/04; B01J 23/58; B01J 23/6562; B01J 29/763; B01J 29/7815; B01J 35/0006; B01J 35/04; F01N 13/009; F01N 2330/06; F01N 2370/04; F01N 2610/02; F01N 2610/1453; F01N 3/101; F01N 3/106; F01N 3/2066; F01N 3/2828; F02B 2043/103; F02B 2043/106; F02B 43/10; F02M 27/04

See application file for complete search history.

(56) References Cited

U.S. PATENT DOCUMENTS

| | | | |
|---|---|---|---|
| 10,961,890 B2* | 3/2021 | Sung | F01N 3/20 |
| 11,028,749 B2* | 6/2021 | Sung | F01N 3/103 |
| 2002/0166546 A1 | 11/2002 | Andrews et al. | |
| 2005/0229872 A1* | 10/2005 | Lange | F02B 43/12 |
| | | | 123/585 |
| 2008/0256933 A1* | 10/2008 | Black | F01N 3/0842 |
| | | | 123/3 |
| 2009/0071452 A1* | 3/2009 | Phlips | F02D 19/0644 |
| | | | 123/575 |
| 2009/0320807 A1* | 12/2009 | Cerny | F02D 19/0671 |
| | | | 123/527 |
| 2012/0296552 A1 | 11/2012 | Matthews, Jr. et al. | |
| 2019/0162091 A1 | 5/2019 | Banno et al. | |
| 2020/0158031 A1* | 5/2020 | Monros | F02D 41/064 |
| 2021/0102486 A1* | 4/2021 | Sung | B01J 23/58 |

OTHER PUBLICATIONS

Notice of Reasons for Refusal dated Jan. 9, 2024, of counterpart Japanese Patent Application No. 2022-571292, along with an English translation.

* cited by examiner

EXHAUST TREATMENT SYSTEM FOR DUAL FUEL ENGINES

This application is a national stage filing under 35 U.S.C. § 371 of International Application No. PCT/US2021/037413, filed on Jun. 15, 2021, and claims the benefit of U.S. Provisional Application No. 63/39,633, filed Jun. 16, 2020, the contents of each application which is incorporated by reference herein in their entirety.

This disclosure generally relates to the field of enhancing the cold start performance of emission treatment systems employing selective catalytic reduction catalysts and oxidation catalysts.

Environmental regulations for emissions of internal combustion engines are becoming increasingly stringent throughout the world. Operation of lean burn engines, for example, diesel engines, provide the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a platinum group metal (PGM) dispersed on a refractory metal oxide support, such as, e.g., alumina, are known for use in treating the exhaust of diesel engines in order to convert both hydrocarbon and carbon monoxide gaseous pollutants to carbon dioxide and water by catalyzing the oxidation of these pollutants. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain PGM promote the oxidation of NO to $NO_2$. Catalysts are typically defined by their light-off temperature or the temperature at which 50% conversion is attained, also called $T_{50}$.

One effective method to reduce $NO_x$ from the exhaust of lean-burn engines requires reaction of $NO_x$ under lean burn engine operating conditions with a suitable reductant, such as, e.g., ammonia or hydrocarbon, in the presence of a selective catalytic reduction (SCR) catalyst. Suitable SCR catalysts include, e.g., metal-containing molecular sieves such as, e.g., metal-containing zeolites. A useful SCR catalyst component is able to effectively catalyze the reduction of the $NO_x$ exhaust component at temperatures below 600° C., so that reduced $NO_x$ levels can be achieved even under conditions of low load, which typically are associated with lower exhaust temperatures.

Catalysts used to treat the exhaust of internal combustion engines are less effective during periods of relatively low temperature operation, such as, e.g., the initial cold-start period of engine operation, because the engine exhaust is not at a sufficiently high temperature for efficient catalytic conversion of noxious components in the exhaust. To this end, it is known in the art to include a sorbent material, which may be, e.g., a zeolite, as part of a catalytic treatment system in order to adsorb and/or absorb gaseous pollutants, such as, e.g., hydrocarbons, and retain them during the initial cold-start period. As the exhaust gas temperature increases, the stored hydrocarbons are driven from the sorbent and subjected to catalytic treatment at the higher temperature.

Increasingly stringent emissions regulations have driven the need to develop emission gas treatment systems with improved CO, HC, and NO oxidation capacity to manage CO, HC, and NO emissions at low engine exhaust temperatures. For example, PCT International Publication No. WO2018/185665 discloses an exhaust gas treatment system that injects hydrogen upstream of a catalyst article to improve low temperature performance during the cold-start period. There is a continuing need in the art to explore further techniques to improve emission treatment systems at low engine exhaust temperatures.

The disclosure provides an emission treatment system, including an oxidation catalyst composition disposed on a substrate in fluid communication with an exhaust gas stream emitted from an engine that combusts both hydrocarbon fuel and hydrogen; and optionally, at least one selective catalytic reduction (SCR) composition disposed on a substrate downstream from the oxidation catalyst composition. In some alternative embodiments, this disclosure provides an emission treatment system, including a TWC catalyst composition disposed on a substrate in fluid communication with an exhaust gas stream emitted from an engine that combusts both hydrocarbon fuel and hydrogen; and optionally, at least one selective catalytic reduction (SCR) composition disposed on a substrate downstream from the oxidation catalyst composition. The disclosure also provides a combustion system including an engine adapted to combust both hydrocarbon fuel and hydrogen fuel and produce an exhaust gas stream, a hydrocarbon fuel source, and a hydrogen fuel source in fluid communication with the engine, in addition to a disclosed emission treatment system. The disclosure further provides a method of treating an exhaust gas stream that includes receiving an exhaust gas stream from an engine, including intermittently receiving an exhaust gas produced by combusting hydrogen fuel, such as during a cold-start period. By combusting hydrogen in the engine during periods of low exhaust gas temperature, emission treatment system performance can be enhanced.

The disclosure includes, without limitation, the following example embodiments:

Embodiment 1: An emission treatment system for treatment of an exhaust gas stream emitted from an engine that combusts both hydrocarbon fuel and hydrogen, comprising:
 an oxidation catalyst composition disposed on a substrate in fluid communication with an exhaust gas stream emitted from an engine that combusts both hydrocarbon fuel and hydrogen; and
 optionally, at least one selective catalytic reduction (SCR) composition disposed on a substrate downstream from the oxidation catalyst composition; and
 optionally, at least one three-way conversion (TWC) catalyst composition disposed on a substrate in fluid communication with the exhaust gas stream emitted from the engine that combusts both hydrocarbon fuel and hydrogen.

Embodiment 2: The emission treatment system of Embodiment 1, wherein the engine is configured for intermittent combustion of hydrogen.

Embodiment 3: The emission treatment system of Embodiment 1 or 2, wherein the engine is configured to combust hydrogen during a cold-start period.

Embodiment 4: The emission treatment system of Embodiment 3, wherein the cold-start period is either:
(i) up to about 300 seconds after engine start-up; or
(ii) the time during which the engine out exhaust gas temperature (i.e., temperature of exhaust upstream of any catalyst components of emission treatment system) is less than 300° C.

Embodiment 5: The emission treatment system of any one of Embodiments 1 to 4, wherein the engine is in fluid communication with a hydrocarbon fuel source and a hydrogen fuel source.

Embodiment 6: The emission treatment system of any one of Embodiments 1 to 5, wherein the hydrocarbon fuel source is selected from the group consisting of gasoline, diesel, and compressed natural gas.

Embodiment 7: The emission treatment system of any one of Embodiments 1 to 6, wherein the hydrogen fuel source comprises a hydrogen storage article, wherein the hydrogen storage article is optionally in fluid communication with a water electrolyzer.

Embodiment 8: The emission treatment system of any one of Embodiments 1 to 7, wherein at least one of the oxidation catalyst composition and the at least one TWC catalyst composition comprises a platinum group metal component dispersed on a refractory metal oxide support.

Embodiment 9: The emission treatment system of any one of Embodiments 1 to 8, wherein at least one of the oxidation catalyst composition and the at least one TWC catalyst composition comprises at least one platinum group metal component in the range of about 5 $g/ft^3$ to about 250 $g/ft^3$, based on the volume of the substrate supporting the composition.

Embodiment 10: The emission treatment system of any one of Embodiments 1 to 9, wherein the substrate supporting the oxidation catalyst composition or the at least one TWC catalyst composition is a flow-through monolith or a monolithic wall-flow filter.

Embodiment 11: The emission treatment system of any one of Embodiments 1 to 10, wherein the flow-through monolith comprises ceramic, metal, composite, fiber, or a combination thereof.

Embodiment 12: The emission treatment system of any one of Embodiments 1 to 11, wherein the substrate supporting the at least one SCR composition is a flow-through monolith or a monolithic wall-flow filter.

Embodiment 13: The emission treatment system of any one of Embodiments 1 to 12, wherein the at least one SCR composition is selected from the group consisting of a base metal-containing molecular sieve, a platinum group metal component dispersed on a refractory metal oxide support, and combinations thereof.

Embodiment 14: The emission treatment system of Embodiment 13, wherein the base metal comprises copper and/or iron.

Embodiment 15: The emission treatment system of Embodiment 13 or 14, wherein the molecular sieve is either an 8-member ring or a 10-member ring small pore molecular sieve.

Embodiment 16: The emission treatment system of any one of Embodiments 13 to 15, wherein the molecular sieve is a zeolite having a structure selected from the group consisting of AEI, AFT, AFX, CHA, EAB, ERI, FER, KFI, LEV, SAS, SAT, and SAV.

Embodiment 17: The emission treatment system of any one of Embodiments 1 to 16, wherein the molecular sieve is an aluminosilicate zeolite having a CHA crystal structure and a silica-to-alumina ratio of from about 1 to about 1000.

Embodiment 18: The emission treatment system of any one of Embodiments 13 to 17, wherein the base metal is present in the molecular sieve from about 0.1 wt. % to about 10 wt. %, based on the total weight of the base metal-containing molecular sieve.

Embodiment 19: The emission treatment system of any one of Embodiments 1 to 18, wherein the at least one SCR catalyst composition comprises a platinum group metal component from about 5 $g/ft^3$ to about 250 $g/ft^3$, based on the volume of the substrate supporting the at least one SCR catalyst composition.

Embodiment 20: The emission treatment system of any one of Embodiments 1 to 19, wherein the system does not comprise any further emission treatment units within the emission treatment system aside from the oxidation catalyst composition disposed on a substrate and the optional at least one SCR composition disposed on a substrate.

Embodiment 21: The emission treatment system of any one of Embodiments 1 to 20, further comprising an injector upstream of and in fluid communication with the at least one SCR composition and configured to introduce ammonia or an ammonia precursor upstream of the at least one SCR composition.

Embodiment 22: A combustion system producing a treated exhaust stream, comprising:
an engine adapted to combust both hydrocarbon fuel and hydrogen fuel and producing an exhaust gas stream;
a hydrocarbon fuel source in fluid communication with the engine;
a hydrogen fuel source in fluid communication with the engine;
an oxidation catalyst composition disposed on a substrate in fluid communication with the exhaust gas stream emitted from the engine; and
optionally, at least one selective catalytic reduction (SCR) composition disposed on a substrate downstream from the oxidation catalyst composition; and
optionally, at least one three-way conversion (TWC) catalyst composition disposed on a substrate in fluid communication with the exhaust gas stream emitted from the engine.

Embodiment 23: The combustion system of Embodiment 22, wherein the engine is configured for intermittent combustion of hydrogen.

Embodiment 24: The combustion system of Embodiment 22 or 23, wherein the engine is configured to combust hydrogen during a cold-start period.

Embodiment 25: The combustion system of Embodiment 24, wherein the cold-start period is either:
(i) up to about 300 seconds after engine start-up; or
(ii) the time during which the engine out exhaust gas temperature is less than 300° C.

Embodiment 26: The combustion system of any one of Embodiments 22 to 25, wherein the hydrocarbon fuel source is selected from the group consisting of gasoline, diesel, and compressed natural gas.

Embodiment 27: The combustion system of any one of Embodiments 22 to 26, w % herein the hydrogen fuel source comprises one or more of a hydrogen storage article and a water electrolyzer.

Embodiment 28: The combustion system of any one of Embodiments 22 to 27, further comprising an injector upstream of and in fluid communication with the at least one SCR composition and configured to introduce ammonia or an ammonia precursor upstream of the at least one SCR composition.

Embodiment 29: A method of treating an exhaust gas stream, the method comprising:
  receiving an exhaust gas stream from an engine adapted to combust both hydrocarbon fuel and hydrogen fuel, wherein the receiving step comprises intermittently receiving an exhaust gas produced by combusting the hydrogen fuel;
  passing the exhaust gas stream through an oxidation catalyst article comprising an oxidation catalyst composition disposed on a substrate in fluid communication with the exhaust gas stream to produce a first effluent; and
  optionally, receiving the first effluent into a selective catalytic reduction (SCR) article comprising at least one SCR composition disposed on a substrate downstream from the oxidation catalyst article; and
  optionally, passing the exhaust gas stream through at least one three-way conversion (TWC) catalyst article comprising a three-way conversion catalyst composition disposed on a substrate in fluid communication with the exhaust gas stream.

Embodiment 30: The method of Embodiment 29, wherein intermittently receiving an exhaust gas produced by combusting the hydrogen fuel comprises receiving an exhaust gas produced by combusting the hydrogen fuel during a cold-start period.

Embodiment 31: The method of Embodiment 30, wherein the cold-start period is either:
  (i) up to about 300 seconds after engine start-up: or
  (ii) the time during which the engine out exhaust gas temperature is less than 300° C.

Embodiment 32: The method of any one of Embodiments 29 to 31, wherein the engine is in fluid communication with a hydrocarbon fuel source and a hydrogen fuel source.

Embodiment 33: The method of any one of Embodiments 29 to 32, wherein the hydrocarbon fuel source is selected from the group consisting of gasoline, diesel, and compressed natural gas.

Embodiment 34: The method of any one of Embodiments 29 to 33, wherein the hydrogen fuel source comprises a hydrogen storage article, wherein the hydrogen storage article is optionally in fluid communication with a water electrolyzer.

Embodiment 35: The method of any one of Embodiments 29 to 34, wherein the method further comprises forming hydrogen fuel through water electrolysis.

In some alternative embodiments of this disclosure, the oxidation catalyst composition disposed on a substrate in fluid communication with an exhaust gas stream emitted from an engine that combusts both hydrocarbon fuel and hydrogen may be replaced with a TWC catalyst composition disposed on a substrate in fluid communication with an exhaust gas stream emitted from an engine that combusts both hydrocarbon fuel and hydrogen. As a non-limiting example, in some alternative embodiments, this disclosure provides an emission treatment system for treatment of an exhaust gas stream emitted from an engine that combusts both hydrocarbon fuel and hydrogen, comprising:
  a TWC catalyst composition disposed on a substrate in fluid communication with an exhaust gas stream emitted from an engine that combusts both hydrocarbon fuel and hydrogen; and
  optionally, at least one selective catalytic reduction (SCR) composition disposed on a substrate downstream from the TWC catalyst composition.

These and other features, aspects, and advantages of the disclosure will be apparent from a reading of the following detailed description, together with the accompanying drawings, which are briefly described below. This disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically, such that any separable features or elements of the disclosure, in any of its various aspects and embodiments, should be viewed as intended to be combinable unless the context clearly dictates otherwise.

BRIEF DESCRIPTION OF THE DRAWINGS

In order to provide an understanding of non-limiting embodiments of the disclosure, reference is made to the appended drawings, which are not necessarily drawn to scale, and in which reference numerals refer to components of exemplary embodiments of the disclosure. The drawings are exemplary only and should not be construed as limiting.

Figure 1:
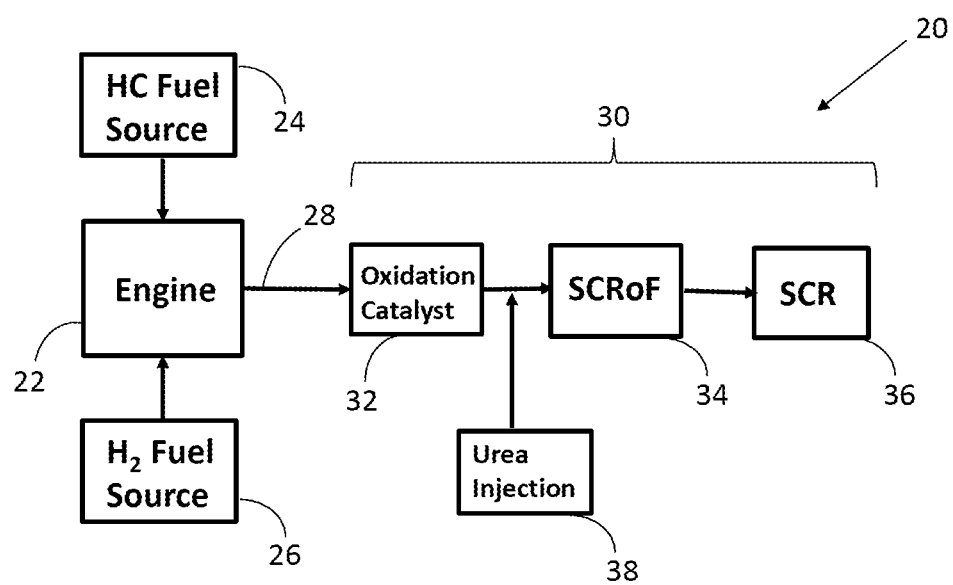
FIG. 1 is a schematic view of a combustion system according to an embodiment of the present disclosure.

Non-limiting embodiments of the present disclosure will be described more fully hereinafter. The disclosed subject matter may, however, be embodied in many different forms and should not be construed as limited to the embodiments set forth herein. Rather, these embodiments are provided so that this disclosure will be thorough and complete, and will fully convey the scope of the disclosure to those skilled in the art. As used in this specification and the claims, the singular forms "a." "an," and "the" include plural referents unless the context clearly dictates otherwise.

The present articles, systems, and methods are suitable for treatment of exhaust gas streams from mobile emissions sources, such as, e.g., vehicles. The articles, systems, and methods are also suitable for treatment of exhaust streams from stationary sources, such as, e.g., power plants.

Definitions

In the present exhaust gas treatment methods, the exhaust gas stream is passed through the article or treatment system by entering the upstream end and exiting the downstream end. As used herein, the "inlet" end of a substrate is synonymous with the "upstream" end or "front" end. As used herein, the "outlet" end is synonymous with the "downstream" end or "rear" end. A substrate will have a length and a diameter.

As used herein, the term "vehicle" means, for instance, any vehicle having an internal combustion engine (e.g., a combustion system of the present disclosure), for instance, a passenger automobile, sport utility vehicle, minivan, van, truck, bus, refuse vehicle, freight truck, construction vehicle, heavy equipment, military vehicle, or tractor.

In general, as used herein, the term "effective" means, for example, from about 35% to 100% effective, for instance, from about 40% effective, about 45% effective, about 50% effective, about 55% effective to about 60% effective, about 65% effective, about 70% effective, about 75% effective, about 80% effective, about 85% effective, about 90% effective, or about 95% effective, regarding the defined catalytic activity or storage/release activity, by weight or by moles.

As used herein, the term "exhaust stream" or "exhaust gas stream" refers to any combination of flowing gas that may contain solid or liquid particulate matter. The stream comprises gaseous components and is, for example, exhaust of a lean burn engine, which may contain certain non-gaseous components, such as, e.g., liquid droplets, solid particulates, and the like. An exhaust stream of a lean burn engine, for example, typically further comprises combustion products, products of incomplete combustion, oxides of nitrogen, combustible and/or carbonaceous particulate matter (soot) and un-reacted oxygen and/or nitrogen.

As used herein, the term "substrate" refers to a monolithic material onto which a catalyst composition, such as, e.g., a catalytic coating, is disposed. In some embodiments, the substrates are flow-through monoliths or monolithic wall-flow filters.

As used herein, the term "catalyst" refers to a material that promotes a chemical reaction. The catalyst includes the "catalytically active species" and the "carrier" that carries or supports the active species. For example, molecular sieves including zeolites are carriers/supports for, e.g., copper active catalytic species. Likewise, refractory metal oxide particles may be a carrier for, e.g., platinum group metal catalytic species.

As used herein, the term "sorbent" refers to a material that adsorbs and/or absorbs a desired substance, i.e., $NO_x$ and/or CO and/or HC and/or $NH_3$. Sorbents may advantageously adsorb and/or absorb (store) a substance at a certain temperature and desorb (release) the substance at a higher temperature.

As used herein, the term "functional article" means an article comprising a substrate having a functional coating composition disposed thereon, in particular a catalyst and/or sorbent coating composition.

The catalytically active species are also termed "promoters" herein as they promote chemical reactions. For instance, the present copper-containing molecular sieves may be termed copper-promoted molecular sieves. A "promoted molecular sieve" refers to a molecular sieve to which catalytically active species are intentionally added.

As used herein, "platinum group metal components" refer to platinum group metals (PGM) or one of their oxides. Platinum group metals (PGM) refer to the six metals from the groups 9, 10, and 11 of the Periodic Table of Elements, including Rh, Pd, Ag, Ir, Pt, and Au. "Rare earth metal components" refer to one or more oxides of the lanthanum series defined in the Periodic Table of Elements, including lanthanum, cerium, praseodymium, and neodymium.

Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1%, or +0.05%. All numeric values are modified by the term "about" whether or not explicitly indicated. Numeric values modified by the term "about" include the specific identified value. For example. "about 5.0" includes 5.0.

Unless otherwise indicated, all parts and percentages are by weight. Weight percent (wt. %), if not otherwise indicated, is based on an entire composition free of any volatiles, that is, based on dry solids content.

All U.S. patent applications, published patent applications, and patents referred to herein are hereby incorporated by reference in their entirety.

The present disclosure provides an emission treatment system suitable for use with a dual fuel engine, and a related method of treating exhaust gas from such an engine. Also provided herein is a combustion system that includes a dual fuel engine that operates using both a hydrocarbon fuel and a hydrogen fuel. In some embodiments, the disclosure provides a combustion system producing a treated exhaust stream, comprising:

an engine adapted to combust a fuel source comprising a hydrocarbon fuel and a hydrogen fuel, and producing an exhaust gas stream;

a hydrocarbon fuel source in fluid communication with the engine;

a hydrogen fuel source in fluid communication with the engine;

an oxidation catalyst composition disposed on a substrate in fluid communication with the exhaust gas stream emitted from the engine; and optionally, at least one selective catalytic reduction (SCR) composition disposed on a substrate downstream from the oxidation catalyst composition; and optionally. at least one three-way conversion (TWC) catalyst composition disposed on a substrate in fluid communication with the exhaust gas stream emitted from the engine.

The emission treatment system includes an oxidation catalyst downstream from an exhaust gas source, such as an engine, and in fluid communication with an exhaust gas stream, and optionally further includes a selective catalytic reduction (SCR) catalyst downstream from the oxidation catalyst. In some embodiments, the emission treatment system performance is improved by intermittent combustion of hydrogen fuel in the dual fuel engine, particularly combustion of hydrogen fuel during periods of low exhaust temperature (e.g., during cold-start periods). When hydrogen is combusted as fuel ($H_2+O_2 \rightarrow H_2O$) during the cold-start period, the combustion heat can serve to increase exhaust gas temperatures without significant emission of pollutants. In some alternative embodiments, the oxidation catalyst is replaced with a TWC catalyst.

Certain embodiments of the present disclosure may enable vehicle manufacturers to meet strict emission control regulations, such as, e.g., Euro-7. In addition, in some embodiments, it may be possible to use less PGM than conventional emission treatment system designs that rely on higher PGM content to improve catalyst light-off during cold-start periods. In certain embodiments of the present disclosure, it may be possible to reduce the size and/or complexity of the emission treatment system without sacrificing emission treatment performance. Still further, in some embodiments of the present disclosure, the use of hydrogen fuel could lead to trace amounts of hydrogen in the exhaust, which could help keep PGM components in an active state (e.g., a reduced state), thereby enhancing light-off properties during the cold-start period.

Accordingly, in some embodiments, the present disclosure provides a combustion system producing a treated exhaust stream. A non-limiting example embodiment of such a combustion system is shown in FIG. 1. As shown, a combustion system 20 can include an engine 22 adapted to combust both hydrocarbon fuel and hydrogen fuel and produce an exhaust gas stream. The engine 22 is in fluid communication with both a hydrocarbon fuel source 24 and a hydrogen fuel source 26. The engine 22 produces an exhaust gas stream 28 that feeds into an emission treatment system 30, which typically includes an oxidation catalyst composition disposed on a substrate 32 in fluid communication with the exhaust gas stream 28 emitted from the engine, and optionally, at least one selective catalytic reduction (SCR) composition disposed on a substrate downstream from the oxidation catalyst composition. The non-limiting example embodiment of FIG. 1 illustrates two SCR catalyst articles. The upstream SCR catalyst article 34 comprises an SCR composition disposed on a wall-flow filter (i.e., an SCRoF component) and the downstream SCR catalyst article 36 comprises an SCR composition disposed on a flow-through substrate. This is merely one configuration of the optional SCR catalyst portion of the system, and the present disclosure encompasses systems with no SCR catalyst component or a single SCR catalyst component disposed on any type of substrate. As shown, the emission treatment system 30 can also include a reductant injector 38 (e.g., an ammonia or an ammonia precursor injector) upstream of the SCR portion of the emission treatment system. Although not shown, the emission treatment system could also include a TWC catalyst article, typically upstream of any optional SCR catalyst articles and optionally as a replacement for the oxidation catalyst article 32.

In operation, the dual fuel engine is configured for intermittent combustion of hydrogen. For example, the engine can be configured to combust hydrogen during a cold-start period. A cold-start period is defined as the period of time from engine ignition/start-up until the exhaust gas emitted from the engine reaches a temperature conducive to catalyst activity, such as, e.g., about 200° C. In certain cases, the cold-start period is up to about 300 seconds after engine start-up (e.g., up to about 275 seconds, or up to about 250 seconds, or up to about 200 seconds, or up to about 150 seconds, or up to about 120 seconds).

The hydrocarbon fuel source can be provided in any manner conventionally used to store and deliver hydrocarbon fuel to an engine. The hydrocarbon fuel source will typically include a refillable storage tank in fluid communication with the engine. Non-limiting example hydrocarbon fuels include gasoline, diesel, and compressed natural gas.

The hydrogen fuel source may be brought on-board in a replaceable or refillable hydrogen storage article or may be generated on-board from water-splitting or from ammonia decomposition. Hydrogen may, for example, be stored in a gas storage tank or reservoir. Hydrogen may be stored for instance in a solid state, for example, in silicon or a hydrogen storage alloy. Solid state hydrogen storage is taught, for example, in U.S. Pre-Grant Publication Nos. 2004/0241507, 2008/0003470, 2008/0274873, 2010/0024542, and 2011/0236790, which are incorporated by reference herein in their entirety. Hydrogen storage alloys reversibly store hydrogen and are disclosed, for example, in U.S. Pat. Nos. 5,407,761 and 6,193,929 and U.S. Pre-Grant Publication No. 2016/0230255, which are incorporated by reference herein in their entirety. Hydrogen storage alloys are, for example, modified $AB_x$ type metal hydride (MH) alloys where, in general, A is a hydride forming element and B is a weak or non-hydride forming element. A is, in general, a larger metallic atom with 4 or less valence electrons and B is, in general, a smaller metallic atom with 5 or more valence electrons. Suitable $AB_x$ alloys include those wherein x is from about 0.5 to about 5. The present alloys are capable of reversibly absorbing (charging) and desorbing (discharging) hydrogen. $AB_x$ type alloys are, for example, of the categories (with simple examples in parentheticals), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$), and $AB_5$ ($LaNi_5$, $CeNi_5$).

In some embodiments, the hydrogen fuel source could include on-board generation of hydrogen through use of a water electrolyzer. Such a system would typically include a replaceable or refillable water tank, optionally equipped with a membrane filter to remove cations. The water from the tank would be fed into a water electrolysis system to be split into $H_2$ and $O_2$. An onboard battery (e.g., a 48V battery) could be used to provide the necessary power for the electrolysis. A non-limiting example electrolysis system that could be adapted for this use is the S Series Proton PEM Electrolyzer available from NEL ASA. (See also the electrolyzer systems set forth in U.S. Pre-Grant Publication Nos. 2013/0263818, 2018/0297841, and 2019/0390354, which are incorporated by reference herein.) The electrolyzer can utilize, for example, a magnetic field generated by a magnet to enhance water splitting. (See Garcés-Pineda, F. A., Blasco-Ahicart, M., Nieto-Castro, D. et al. Direct magnetic enhancement of electrocatalytic water oxidation in alkaline media. *Nat Energy* 4, 519-525 (2019).) Non-limiting example electrolyzer systems can generate hydrogen under atmospheric conditions (e.g., 540° C.) and deliver a pressure stream of hydrogen up to 200 psig. During normal driving conditions, the engine can generate sufficient power to recharge the battery and dissociate the water for hydrogen production.

The reductant injector 38 shown in FIG. 1 can be, for example, a urea or an ammonia injection article in fluid communication with the treatment system and may comprise reservoirs, pumps, spray nozzles, valves, mixing boxes, etc. For example, aqueous urea (or other suitable reductant, such as, e.g., ammonia or other ammonia precursors) can be mixed with air in a mixing box. A valve can be used to meter precise amounts of aqueous urea into the exhaust stream. Urea is converted to ammonia, which serves as the reductant in the SCR catalyst unit.

The SCR catalyst (typically in the form of an SCR catalyst coated on a flow-through monolith or wall-flow filter) and the oxidation catalyst (typically in the form of an oxidation catalyst coated on a flow-through monolith) are each functional articles and together comprise an exhaust gas treatment system. The treatment system is in general downstream of and in fluid communication with an internal combustion engine or other exhaust gas source. The SCR catalyst is downstream of and in fluid communication with the oxidation catalyst. For example, in some embodiments, the present treatment system contains only one or two functional articles; that is, the oxidation catalyst alone (e.g., for certain gasoline engine applications) and the SCR catalyst (optionally including two SCR catalyst compositions) and the oxidation catalyst (e.g., for certain diesel engine applications).

Coating compositions are typically added to a substrate by forming a washcoat. A washcoat is formed by preparing a slurry containing a specified solids content (e.g., about 10% to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied.

Catalyst and/or sorbent compositions may be prepared using a binder, for example, a $ZrO_2$ binder derived from a suitable precursor, such as, e.g., zirconyl acetate or any other suitable zirconium precursor, such as, e.g., zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include, but are not limited to, aluminum oxides, aluminum hydroxides, and aluminum oxyhydroxides. Aluminum salts and colloidal forms of alumina may also be used. Silica binders include, but are not limited to, various forms of $SiO_2$, including silicates and colloidal silica. In some embodiments, binder compositions may include any combination of zirconia, alumina, and silica.

Oxidation Catalyst Compositions

The oxidation catalyst is suitable to oxidize $NO_x$ and/or CO and/or HC components of exhaust gas, for example, at a relatively low temperature of <250° C. Suitable oxidation catalysts may comprise a platinum group metal (PGM) dispersed on a refractory metal oxide support.

The support material on which the catalytically active PGM is deposited, for example, comprises a refractory metal oxide, which exhibits chemical and physical stability at high temperatures, such as the temperatures associated with gasoline or diesel engine exhaust. Exemplary metal oxides include, but are not limited to, alumina, silica, zirconia, titania, cena, praseodymia, tin oxide, and the like, as well as physical mixtures or chemical combinations thereof, including atomically-doped combinations and including high surface area or activated compounds, such as, e.g., activated alumina.

Example combinations of metal oxides include, but are not limited to, silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina, and alumina-ceria. Exemplary aluminas include, but are not limited to, large pore boehmite, gamma-alumina and delta/theta alumina. Useful commercial aluminas used as starting materials in exemplary processes include, but are not limited to, activated aluminas, such as high bulk density gamma-alumina, low or medium bulk density large pore gamma-alumina, and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 to about 300 $m^2/g$. Such activated alumina is usually a mixture of the gamma and delta phases of alumina, but may also contain substantial amounts of eta, kappa, and theta alumina phases. "BET surface area," as used herein, has its usual meaning of referring to the Brunauer, Emmett. Teller method for determining surface area by $N_2$ adsorption. In some embodiments, the active alumina has a specific surface area of about 60 to about 350 $m^2/g$, for example, from about 90 to about 250 $m^2/g$.

In some embodiments, metal oxide supports useful in the catalyst compositions disclosed herein are doped alumina materials, such as, e.g., Si-doped alumina materials (including, but not limited to, 1-10% $SiO_2$—$Al_2O_3$), doped titania materials, such as, e.g., Si-doped titania materials (including, but not limited to 1-10% $SiO_2$—$TiO_2$), or doped zirconia materials, such as, e.g., Si-doped $ZrO_2$ (including, but not limited to 5-30% $SiO_2$—$ZrO_2$).

In some embodiments, a refractory metal oxide may be doped with one or more additional basic metal oxide materials, such as, e.g., lanthanum oxide, barium oxide, strontium oxide, calcium oxide, magnesium oxide or combinations thereof. The metal oxide dopant is typically present in an amount of about 1% to about 20% by weight, based on the weight of the catalyst composition. The dopant oxide materials may serve to improve the high temperature stability of the refractory metal oxide support or function as a sorbent for acidic gases such as $NO_2$, $SO_2$, or $SO_3$.

The dopant metal oxides can be introduced using an incipient wetness impregnation technique or by addition of colloidal mixed oxide particles. Doped metal oxides include, but are not limited to, baria-alumina, baria-zirconia, baria-titania, baria-zirconia-alumina, lanthana-zirconia, and the like.

Thus, the refractory metal oxides or refractory mixed metal oxides in the catalyst compositions are typically selected from (such as, e.g., selected from the group consisting of) alumina, zirconia, silica, titania, ceria (such as, e.g., bulk ceria), manganese oxide, zirconia-alumina, ceria-zirconia, ceria-alumina, lanthana-alumina, baria-alumina, silica, silica-alumina, and combinations thereof. Further doping with basic metal oxides provides additional useful refractory oxide supports including, but not limited to, baria-alumina, baria-zirconia, baria-titania, baria-zirconia-alumina, lanthana-zirconia, and the like.

The oxidation catalyst composition may comprise any of the above-named refractory metal oxides and in any amount. For example, refractory metal oxides in the catalyst composition may comprise at least about 15, at least about 20, at least about 25, at least about 30 or at least about 35 wt. % (weight percent) alumina, where the wt. % is based on the total dry weight of the catalyst composition. The catalyst composition may, for example, comprise from about 10 to about 99 wt. % alumina, from about 15 to about 95 wt. % alumina, or from about 20 to about 85 wt. % alumina.

The oxidation catalyst composition comprises, for example, from about 15 wt. %, about 20 wt. %, about 25 wt. %, about 30 wt. %, about 35 wt. % to about 50 wt. %, about 55 wt. %, about 60 wt. %, about 65 wt. %, or about 70 wt. % alumina, based on the weight of the catalytic composition.

In some embodiments, the oxidation catalyst composition may comprise ceria, alumina, and zirconia, or doped compositions thereof.

The oxidation catalyst composition coated onto a substrate may comprise a PGM component from about 0.1 wt. % (weight percent), about 0.5 wt. %, about 1.0 wt. %, about 1.5 wt. %, about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. about 19 wt. %, or about 20 wt. %, based on the weight of the dry composition.

The PGM component of the oxidation catalyst composition is, for example, present from about 5 g/ft$^3$, about 10 g/ft$^3$, about 15 g/ft$^3$, about 20 g/ft$^3$, about 40 g/ft$^3$, about 50 g/ft$^3$ to about 70 g/ft$^3$, about 90 g/ft$^3$, about 100 g/ft$^3$, about 120 g/ft$^3$, about 130 g/ft$^3$, about 140 g/ft$^3$, about 150 g/ft$^3$, about 160 g/ft$^3$, about 170 g/ft$^3$, about 180 g/ft$^3$, about 190 g/ft$^3$, about 200 g/ft$^3$, about 210 g/ft$^3$, about 220 g/ft$^3$, about 230 g/ft$^3$, about 240 g/ft$^3$ or about 250 g/ft$^3$, based on the volume of the substrate.

The oxidation catalyst composition in addition to the refractory metal oxide support and catalytically active metal may further comprise any one or combinations of the oxides of lanthanum, barium, praseodymium, neodymium, samarium, strontium, calcium, magnesium, niobium, hafnium, gadolinium, terbium, dysprosium, erbium, ytterbium, manganese, iron, chromium, tin, zinc, nickel, cobalt, or copper.

Optionally, the oxidation catalyst unit can further include, either as a separate composition layer or as part of a homogenous mixture with the oxidation catalyst composition, a sorbent composition suitable to adsorb and/or absorb $NO_x$ and/or CO and/or HC components of exhaust gas. Suitable sorbents include, but are not limited to, materials, such as, e.g., alkaline earth metal oxides, alkaline earth metal carbonates, rare earth oxides, and molecular sieves. Included, for example, are oxides or carbonates of Mg, Ca, Sr, or Ba and/or oxides of Ce, La, Pr, or Nd. Sorbent molecular sieves include, but are not limited to, zeolites.

In some embodiments, the sorbent comprises a molecular sieve. The present molecular sieves comprise small pore, medium pore, and large pore molecular sieves, or combinations thereof. A small pore molecular sieve contains channels defined by up to eight tetrahedral atoms. A medium pore molecular sieve contains channels defined by ten-membered rings. A large pore molecular sieve contains channels defined by twelve-membered rings. In some embodiments, these molecular sieves are selected from H$^+$-forms of large pore molecular sieves, such as, e.g., Beta zeolite or clinoptilolite. Also suitable are base metal-containing molecular sieves including, e.g., FeBeta and CuCHA. Other non-limiting examples of large pore molecular sieves are those listed above and also ZSM-12, SAPO-37, etc.

In some embodiments, small pore molecular sieves are selected from (e.g., are selected from the group consisting) aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal-containing silico-aluminophosphate (MeSAPO) molecular sieves, and mixtures thereof. For example, small pore molecular sieves are selected from (e.g., are selected from the group consisting of) framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, STV, THO, TSC, UEI, UFI, VNI, YUG, ZON, and mixtures or intergrowths thereof.

For instance, the small pore molecular sieve is selected from framework types CHA, LEV, AEI, AFX, ERI, SFW, KFI, DDR, and ITE.

In some embodiments, medium pore molecular sieves are selected from (e.g., are selected from the group consisting of) framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof. For instance, the medium pore molecular sieves are selected from (e.g., are selected from the group consisting of) framework types FER, MEL, MFI and STT.

In some embodiments, large pore molecular sieves are selected from (e.g., are selected from the group consisting of) framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MET, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof. For instance, the large pore molecular sieves are selected from (e.g., are selected from the group consisting of) framework types AFI, BEA, MAZ, MOR, and OFF.

For example, molecular sieves may comprise a framework type selected from (e.g., selected from the group consisting of) AEI, BEA (Beta zeolites), CHA (chabazite), FAU (zeolite Y), FER (ferrierite), MFI (ZSM-5), and MOR (mordenite). Non-limiting examples of zeolites having these structures include chabazite, faujasite, zeolite Y, ultrastable zeolite Y, Beta zeolite, mordenite, silicalite, zeolite X, and ZSM-5.

Useful molecular sieves may have 8-ring pore openings and double-six ring secondary building units, for example, those having structure types AEI, AFT, AFX, CHA, EAB, ERI, KFI, LEV, SAS, SAT, or SAV. Included are any and all isotopic framework materials, such as, e.g., SAPO, AlPO, and MeAlPO materials having the same structure type.

The 8-ring small pore molecular sieves include, but are not limited to, aluminosilicates, borosilicates, gallosilicates, MeAPSOs, and MeAlPOs. These include, for example, SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44, and CuSAPO-47. In some embodiments, the 8-ring small pore molecular sieve will have an aluminosilicate composition, such as, e.g., SSZ-13 and SSZ-62.

In some embodiments, the 8-ring small pore molecular sieve has the CHA crystal structure and is selected from (e.g., selected from the group consisting of) aluminosilicate zeolite having the CHA crystal structure. SAPO. AlPO, and MeAlPO. For example, the 8-ring small pore molecular sieve having the CHA crystal structure is an aluminosilicate zeolite having the CHA crystal structure. In some embodiments, the 8-ring small pore molecular sieve having the CHA crystal structure will have an aluminosilicate composition, such as, e.g., SSZ-13 or SSZ-62.

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite includes a naturally occurring tectosilicate mineral of a zeolite group with approximate formula (Ca, Na$_2$, K$_2$, Mg)Al$_2$Si$_4$O$_{12}$.6H$_2$O (i.e., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in *J. Chem. Soc.*, p. 2822 (1956), Barrer et. Al: Zeolite D, described in British Patent No. 868,846 (1961); and Zeolite R, described in U.S. Pat. No. 3,030,181, which is incorporated by reference herein in its entirety. Synthesis of another synthetic form of zeolitic chabazite, SSZ-13, is described in U.S. Pat. No. 4,544,538, which is incorporated by reference herein in its entirety. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789, which are incorporated by reference herein in their entirety. A method of making yet another synthetic non-zeolitic molecular sieve having chabazite structure, SAPO-44, is described, for instance, in U.S. Pat. No. 6,162,415, which is incorporated by reference herein in its entirety.

A synthetic 8-ring small pore molecular sieve (for example, having the CHA structure) may be prepared via mixing a source of silica, a source of alumina, and a structure directing agent under alkaline aqueous conditions. Non-limiting examples of silica sources include various types of fumed silica, precipitated silica and colloidal silica, as well as silicon alkoxides. Non-limiting example alumina sources include boehmites, pseudo-boehmites, aluminum hydroxides, aluminum salts such as aluminum sulfite or sodium aluminate, and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance, from about 135° C. to about 170° C. Typical reaction times are between 1 hour and 30 days, and in some embodiments, from 10 hours to 3 days. At the conclusion of the reaction, the pH is optionally adjusted to between 6 and 10, for example, between 7 and 7.5, and the product is filtered and washed with water. Any acid can be used for pH adjustment, for instance, nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C.

Molecular sieves having a CHA structure may be prepared, for instance, according to methods disclosed in U.S. Pat. Nos. 4,544,538 and 6,709,644, which are incorporated by reference herein in their entirety.

In some embodiments, the molecular sieves may have a silica-to-alumina ratio (SAR) of about 1, about 2, about 5, about 8, about 10, about 15, about 20, about 25 to about 30, about 35, about 40, about 45, about 50, about 60, about 70, about 80 about 90, about 100, about 150, about 200, about 260, about 300, about 400, about 500, about 750, or about 1000.

For instance, present molecular sieves may have an SAR of from about 5 to about 250, from about 10 to about 200, from about 2 to about 300, from about 5 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60, or from about 20 to about 50.

In some embodiments, the molecular sieves are, for instance, porous molecular sieve particles wherein greater than 90% of the molecular sieve particles have a particle size greater than 1 μm. In some embodiments, the molecular sieve particle size has a do less than 80 microns. In some embodiments, the molecular sieve particles have a do less than 80, 70, 60, 55, 50, 45, 40, 35, 30, 25, 20, 15, or 10 microns. In some embodiments, the molecular sieve particle size has a $d_{50}$ less than 50 microns. In some embodiments, greater than 95% of the molecular sieve particles have a particle size greater than 1 μm, and in more specific embodiments, greater than 9%% of the molecular sieve particles have a particle size greater than 1 μm and in even more specific embodiments, the molecular sieve particle component comprises about 96% particles greater than 1 μm and about 85% of particles greater than 2 μm, and in highly specific embodiments, the molecular sieve particle component comprises about 9%% particles within 5 μm of the mean particle size and the mean particle size is greater than about 5 μm. In some embodiments, the molecular sieve particle component comprises 96% particles in the range of about 1 μm to 10 μm. Molecular sieves suitable for adsorption are disclosed for example in U.S. Pre-Grant Publication No. 2016/0136626 and U.S. Pat. No. 9,321,042, which are incorporated by reference herein in their entirety.

The molecular sieves may exhibit a high surface area, for example, a BET surface area, determined according to DIN 66131, of at least about 400 m$^2$/g, at least about 550 m$^2$/g, or at least about 650 m$^2$/g, for example, from about 400 to about 750 m$^2$/g or from about 500 to about 750 m$^2$/g. The present molecular sieves may have a mean crystal size of from about 10 nanometers to about 10 microns, from about 50 nanometers to about 5 microns, or from about 0.1 microns to about 0.5 microns, as determined via SEM. For instance, the molecular sieve crystallites may have a crystal size greater than 0.1 microns or 1 micron and less than 5 microns.

In some embodiments, the sorbent is a zeolite. The zeolite can be a natural or synthetic zeolite, such as, e.g., faujasite, chabazite, clinoptilolite, mordenite, silicalite, zeolite X, zeolite Y, ultrastable zeolite Y, ZSM-5 zeolite, offretite, or a Beta zeolite. Zeolite adsorbent materials may have a high silica-to-alumina ratio. The zeolites may have a silica-to-alumina molar ratio of from at least about 5:1, such as, e.g., at least about 50:1, such as, e.g., from about 5:1 to 1000:1, 50:1 to 500:1, as well as about 25:1 to 300:1. Suitable zeolites include, but are not limited to, ZSM, Y, and Beta zeolites. A HC adsorbent may comprise a Beta zeolite of the type disclosed in U.S. Pat. No. 6,171,556.

Aluminosilicate zeolite structures do not include phosphorus or other metals isomorphically substituted in the framework. That is, "aluminosilicate zeolite" excludes aluminophosphate materials such as SAPO. AlPO, and MeAlPO materials, while the broader term "zeolite" includes aluminosilicates and aluminophosphates. For the purposes of this disclosure, SAPO, AlPO, and MeAlPO materials are considered non-zeolitic molecular sieves.

The functional coating that provides the oxidation catalyst composition may comprise more than one thin adherent layer, the layers in adherence to each other and the coating in adherence to the substrate.

In some embodiments, the entire coating comprises the individual "coating layers." The functional coating may be "zoned," comprising zoned functional layers. This may also be described as "laterally zoned." For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end, extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example, about 5%, about 10%, about 20%, about 30%, about 40%, about 50%, about 60%, or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different functional compositions may reside in each separate coating layer. For example, one coating layer could comprise an oxidation catalyst composition without any optional sorbent compositions and a second layer could include (or consist entirely of) one or more optional sorbent compositions. Thus, discussion related to different layers may correspond to any of these layers. The coating composition may comprise 1, 2, or 3 or more coating layers. In some embodiments, the one or more coating layers together comprise the 3 functional compositions.

In some embodiments, the oxidation catalyst unit is in a close-coupled position. A close-coupled position is, for, instance within about 12 inches (in) from where individual cylinder exhaust pipes join together (i.e., the exhaust manifold), for instance, from about 0.5 in, about 1 in, about 2 in, about 3 in, about 4 in, about 5 in to about 6 in, about 7 in, about 8 in, about 9 in, about 10 in, about 11 in, or about 12 in.

SCR Compositions

The SCR composition used in the SCR article can comprise one or more SCR catalyst compositions as described herein. In certain embodiments, the SCR composition is, for example, effective to operate at two different temperature ranges, such as, e.g., at low temperatures of <250° C. and at high temperatures of from about 250° C. to about 550° C. For example, in certain embodiments, the SCR coating composition comprises a first SCR catalyst comprising a PGM component disposed on a refractory metal oxide and a second base metal-containing molecular sieve SCR catalyst.

A non-limiting example SCR composition comprises one or more platinum group metals disposed on a high surface area, refractory metal oxide support, e.g., a high surface area alumina support. The PGM in the SCR composition is, for instance, rhodium. In some embodiments, the PGM-based SCR catalyst may be effective at temperatures of ≤250° C.

The SCR catalyst may comprise a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry catalyst.

The PGM component of the catalyst is for example present from about 5 g/ft$^3$, 10 g/ft$^3$, about 15 g/ft$^3$, about 20 g/ft$^3$, about 40 g/ft$^3$ or about 50 g/ft$^3$ to about 70 g/ft$^3$, about 90 g/ft$^3$, about 100 g/ft$^3$, about 120 g/ft$^3$, about 130 g/ft$^3$, about 140 g/ft$^3$, about 150 g/ft$^3$, about 160 g/ft$^3$, about 170 g/ft$^3$, about 180 g/ft$^3$, about 190 g/ft$^3$, about 200 g/ft$^3$, about 210 g/ft$^3$, about 220 g/ft$^3$, about 230 g/ft$^3$, about 240 g/ft$^3$ or about 250 g/ft$^3$, based on the volume of the substrate.

The SCR composition can also comprise a base metal-containing molecular sieve catalyst composition, effective at higher temperatures of from about 250° C. to about 550° C. This catalyst will, in general, employ injected urea as an ammonia precursor, where ammonia is the active reductant. In operation, urea is periodically metered into the exhaust stream from a position upstream of the SCR article. The injector is in fluid communication with and upstream of the SCR article. The injector will in general also be associated with a reductant (or reductant precursor) reservoir and a pump.

Suitable molecular sieves are as described herein in reference to the oxidation catalyst composition. Non-limiting examples of molecular sieves have, for instance, 8-ring pore openings and double-six ring secondary building units, for example, those having the following structure types: AEI, AFT, AFX. CHA, EAB, ERI, KFI, LEV, SAS, SAT, or SAV. Included are any and all isotopic framework materials such as SAPO, AlPO and MeAlPO materials having the same structure type. For instance, the present molecular sieves may each have an SAR of from about 5 to about 50, for instance, from about 10 to about 30.

In some embodiments, the 8-ring small pore molecular sieve has the CHA crystal structure and is selected from (e.g., selected from the group consisting of) aluminosilicate zeolites having the CHA crystal structure, SAPO, AlPO, and MeAlPO. In some embodiments, the 8-ring small pore molecular sieve having the CHA crystal structure is an aluminosilicate zeolite having the CHA crystal structure. In some embodiments, the 8-ring small pore molecular sieve having the CHA crystal structure will have an aluminosilicate composition, such as, e.g., SSZ-13 or SSZ-62.

The base metal contained in the present base metal-containing molecular sieves catalyst composition is, for example, copper or iron or a mixture thereof. Copper- and iron-containing chabazite are termed CuCHA and FeCHA herein.

The copper or iron resides in the ion-exchange sites (pores) of the molecular sieves and may also be associated with the molecular sieves but not "in" the pores. For example, upon calcination, non-exchanged copper salt decomposes to CuO, also referred to herein as "free copper" or "soluble copper." In some embodiments, the free copper may be as disclosed in U.S. Pat. No. 8,404,203, which is incorporated by reference herein in its entirety. The amount of free copper may be less than, equal to, or greater than the amount of ion-exchanged copper.

The copper- or iron-containing molecular sieves are prepared, for example, via ion-exchange from, for example, a Na$^+$ containing molecular sieve (Na$^+$ form). The Na$^+$ form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper or iron. Optionally, the $NH_4^+$-exchanged molecular sieve is calcined to the $H^+$-form, which may also be employed for ion-exchange with copper or iron cations.

In some embodiments, copper or iron is ion-exchanged into molecular sieves with alkali metal, $NH_4^+$, or $H^+$ forms with copper or iron salts, such as, e.g., copper acetate, copper sulfate, iron chloride, iron acetate, iron nitrate, iron sulfate, and the like, for example, as disclosed in U.S. Pat. No. 9,242,238, which is incorporated by reference herein in its entirety. For instance, a $Na^+$, $NH_4^+$ or $H^+$ form of a molecular sieve is mixed with an aqueous salt solution and agitated at an elevated temperature for a suitable time. The slurry is filtered, and the filter cake is washed and dried.

Iron addition comprises, for instance, ion-exchange processes, impregnation of an iron salt, or mixing a molecular sieve with iron oxide. Suitable iron-containing molecular sieves are disclosed, for instance, in U.S. Pat. No. 9,011,807, which is incorporated by reference herein in its entirety.

The amount of base metal in the molecular sieve is, for example, from about 0.1, about 0.3, about 0.5, about 0.7, about 1.0 or about 1.5 to about 3.0, about 4.0, about 5.0, about 6.0, about 7.0, about 8.0, about 9.0 or about 10 wt. % (weight percent), based on the total weight of the metal-containing molecular sieve. The amount of base metal is measured and reported as the oxide.

In some embodiments, the base metal-containing molecular sieve is present on the substrate at a loading (concentration) of, for instance, from about 0.3 $g/in^3$ to about 4.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$ or about 4.0 $g/in^3$, based on the substrate. This refers to dry solids weight per volume of substrate, for example, per volume of a honeycomb monolith. An amount of base metal per volume would, for instance, be from about 0.2% to about 10% of the above values. An amount of base metal per volume is the base metal concentration. An amount of a base metal-containing molecular sieve per volume is the molecular sieve concentration. Concentration is based on a cross-section of a substrate or on an entire substrate.

A method for activating an iron-containing molecular sieve includes adding iron into a molecular sieve followed by steam-calcination of the resulting iron-containing molecular sieve powder from about 500° C. to about 800° C. for a period of from about 20 minutes to about 12 hours in the presence of water vapor or from about 650° C. to about 750° C. for a period of from about 20 minutes to about 2 hours in the presence of water vapor. The steam-calcination periods are, for example, from about 20 minutes to about 1 hour or 1.5 hours. The resulting steam-activated iron-containing molecular sieve powders may be spray-dried or air-dried.

If more than one type of SCR coating composition is used in the system, such compositions may be zoned and have optional undercoats and/or overcoats. Configurations of coating layers are not limited. For example, two different SCR catalyst compositions may each be in a separate coating layer, w % herein the coating layers are in a zone configuration from front to back or are in a configuration from proximal the substrate to distal the substrate or some combination thereof. Alternatively, the functional compositions may be together in one coating layer or in some combination spread over two coating layers.

As noted above, in some embodiments, the SCR functional coating may be "zoned." comprising zoned functional layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example, about 5%, about 10%, about 20%, about 30%, about 40%, about 50%, about 60%, or about 70% of the substrate length.

As noted above, different layers may each extend the entire length of the substrate or may each extend a portion of the length of the substrate and may overlay or underlay each other, either partially or entirely. Each of the different layers may extend from either the inlet or outlet end. The coating composition may comprise 1, 2, or 3 or more coating layers.

Different coating layers may be in direct contact with the substrate. Alternatively, one or more "undercoats" may be present, so that at least a portion a functional coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat," the gap between the different layers is termed an "interlayer." An undercoat is a layer "under" a coating layer, an overcoat is a layer "over" a coating layer, and an interlayer is a layer "between" two coating layers. The interlayer(s), undercoat(s), and overcoat(s) may contain one or more functional compositions or may be free of functional compositions.

TWC Compositions

Exhaust gas from vehicles powered by gasoline engines operated at or near stoichiometric air/fuel conditions is typically treated with a three-way catalyst (TWC), which is effective to abate nitrogen oxides ($NO_x$), carbon monoxide (CO), and hydrocarbon (HC) pollutants in the exhaust. Typically, a TWC catalyst comprises one or more platinum group metals, such as, e.g., palladium and/or rhodium and optionally platinum, and an oxygen storage component. In certain embodiments, the amount of PGM components utilized in the TWC catalyst composition can be generally the same as set forth above with respect to oxidation catalysts.

In some embodiments, the TWC composition comprises PGM components, such as, for example, platinum (Pt), palladium (Pd), and rhodium (Rh), impregnated onto a porous support material. Pt and Pd are generally used for HC and CO conversion, while Rh is more effective for the reduction of $NO_x$. Optionally, a TWC may include an oxygen storage component (OSC).

As used herein, "OSC" refers to an entity that has multivalent oxidation states and that can actively react with oxidants such as oxygen ($O_2$) or nitrogen oxides ($NO_x$) under oxidizing conditions, or react with reductants such as carbon monoxide (CO), hydrocarbons (HC), or hydrogen ($H_2$) under reducing conditions. For example, cerium in ceria ($CeO_2$; $Ce^{+4}$), when subjected to reducing conditions, may contain a portion of the cerium atoms in the $Ce^{+3}$ valence state. Certain non-limiting exemplary OSCs are rare earth metal oxides, which refer to one or more oxides of scandium, yttrium, and the lanthanide series as defined in the Periodic Table of Elements.

In some embodiments, the OSC consists of a single rare earth metal oxide or may comprise a mixture of more than one rare earth metal oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium. In some embodiments, the OSC comprises ceria, zirconia, alumina, silica, titania, lanthana, baria, praseodymia, yttria, samaria, gadolinia, or a combination thereof. In some embodiments, the OSC comprises ceria. In some embodiments, the OSC comprises ceria and at least one additional rare earth metal oxide. In some embodiments, the OSC and the PGM component are both supported on the same support material.

Substrates

In some embodiments, useful substrates are 3-dimensional, having a length and a diameter and a volume, similar to a cylinder. The shape does not necessarily have to conform to a cylinder. The length is an axial length defined by an inlet end and an outlet end. According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, such as, e.g., cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, corrugated sheet or monolithic foam. Specific non-limiting examples of metallic substrates include heat-resistant, base-metal alloys, especially those in which iron is a substantial or major component. Such alloys may contain one or more of nickel, chromium, and aluminum, and the total of these metals may, e.g., comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Non-limiting examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, may be employed in certain embodiments in a close-coupled position, allowing for fast heat-up of the substrate and, correspondingly, fast heat up of a catalyst composition coated therein (e.g., a LT-CO oxidation catalyst composition).

Any suitable substrate for the catalytic articles disclosed herein may be employed, such as, e.g., a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter").

Flow-Through Substrates

In some embodiments, the substrate is a flow-through substrate (e.g., a monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example, from about 200 to about 400 cpsi and a wall thickness of from about 50 to about 200 microns or about 400 microns.

Figure 2A:
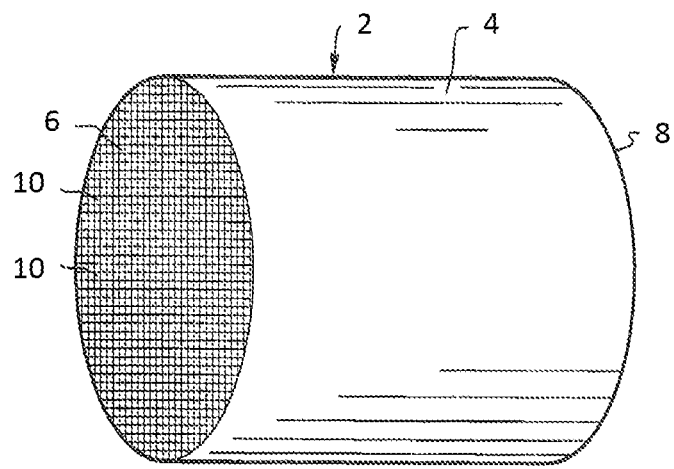
FIG. 2A is a perspective view of a honeycomb-type substrate which may comprise a catalyst washcoat composition in accordance with the present disclosure.
Figure 2B:
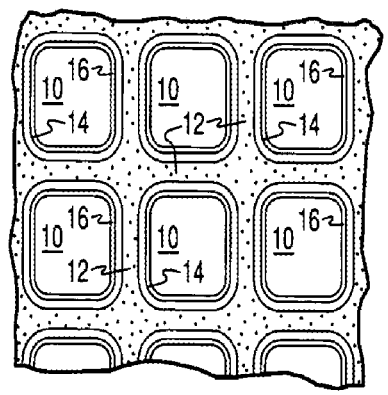
FIG. 2B is a partial cross-sectional view enlarged relative to FIG. 2A and taken along a plane parallel to the end faces of the substrate of FIG. 2A, which shows an enlarged view of a plurality of the gas flow passages shown in FIG. 2A, in an embodiment wherein the substrate is a flow-through substrate.

A catalytic article can be provided by applying a catalytic coating (e.g., as disclosed herein) to the substrate as a washcoat. FIGS. 2A and 2B illustrate an exemplary substrate 2 in the form of a flow-through substrate coated with a catalyst composition as described herein. Referring to FIG. 2A, the exemplary substrate 2 has a cylindrical shape and a cylindrical outer surface 4, an upstream end face 6, and a corresponding downstream end face 8, which is identical to end face 6. Substrate 2 has a plurality of fine, parallel gas flow passages 10 formed therein. As seen in FIG. 23, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2B, walls 12 are so dimensioned and configured that gas flow passages 10 have a substantially regular polygonal shape. As shown, the catalyst composition can be applied in multiple, distinct layers, if desired. In the illustrated embodiment, the catalyst composition consists of both a discrete bottom layer 14 adhered to the walls 12 of the carrier member and a second discrete top layer 16 coated over the bottom layer 14. Embodiments of the present disclosure can be practiced with one or more (e.g., two, three, or four or more) catalyst composition layers and are not limited to the two-layer embodiment illustrated in FIG.

2B. For example, further non-limiting coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, such as, e.g., from about 100 to 400, cells per square inch ("cpsi"). The cells can have cross-sections that are rectangular, square, circular, oval, triangular, hexagonal, or are of other polygonal shapes.

Figure 3:
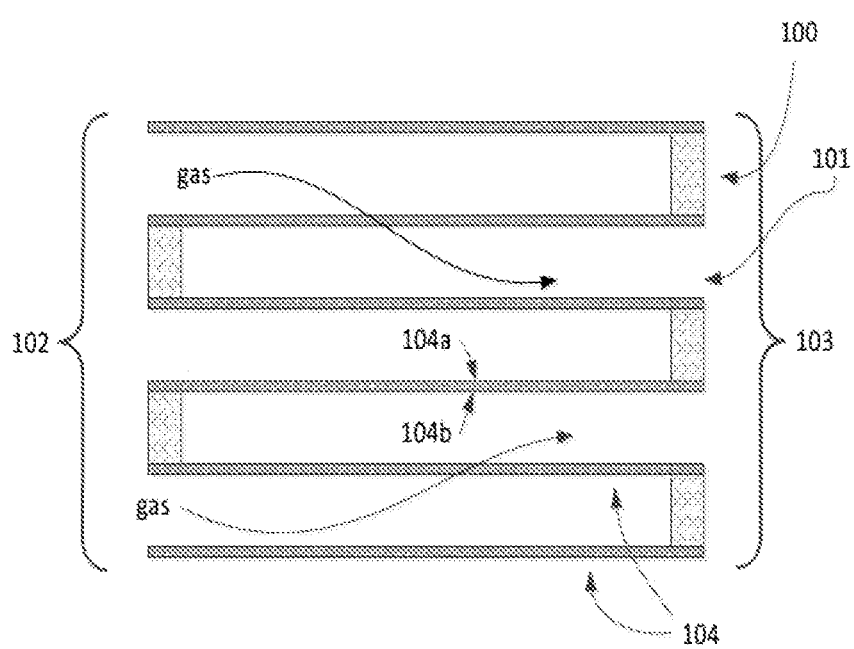
FIG. 3 is a cutaway view of a section enlarged relative to FIG. 2A, wherein the honeycomb-type substrate in FIG. 2A represents a wall-flow filter.

FIG. 3 is a cross-section view of an example monolithic wall-flow filter substrate section, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 $cm^3$, about 100 $cm^3$, about 200 $cm^3$, about 300 $cm^3$, about 400 $cm^3$, about 500 $cm^3$, about 600 $cm^3$, about 700 $cm^3$, about 800 $cm^3$, about 900 $cm^3$ or about 1000 $cm^3$ to about 1500 $cm^3$, about 2000 $cm^3$, about 2500 $cm^3$, about 3000 $cm^3$, about 3500 $cm^3$, about 4000 $cm^3$, about 4500 $cm^3$ or about 5000 $cm^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, in some embodiments, the wall-flow filter article substrate will have a porosity of ≥50%, ≥60%, ≥65% or ≥70%. For instance, in some embodiments, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Catalyzed wall-flow filters are disclosed for instance in U.S. Pat. No. 7,229,597, which is hereby incorporated by reference in its entirety. This reference teaches a method of applying a catalytic coating such that the coating permeates the porous walls, that is, is dispersed throughout the walls. Flow-through and wall-flow substrates are also taught for example in PCT International Publication NO$_x$ WO2016/070090, which is hereby incorporated by reference in its entirety.

A functional coating may be on the substrate wall surfaces and/or in the pores of the filter walls, that is "in" and/or "on" the filter walls. Thus, the phrase "a catalytic coating disposed on the substrate" means on any surface, for example, on a wall surface and/or on a pore surface. The functional coating may be on and/or in only one side of the cell walls, that is only on and/or in the inlet or outlet sides. Alternatively, the functional coating may be disposed on both the inlet and outlet sides of the walls.

Also provided herein is a method for treating an exhaust gas stream containing $NO_x$ and/or CO and/or HC and/or soot, comprising receiving the exhaust stream from a dual fuel engine into the present exhaust gas treatment system. In some embodiments, the exhaust gas stream is received into the article or system from the upstream end and exits the downstream end. By using intermittent combustion of hydrogen in the engine, the emission treatment system described herein can provide enhanced performance at low engine exhaust temperatures in certain embodiments. In particular, hydrogen combustion during cold-start periods is believed to boost performance of the overall emission treatment system.

In some embodiments, the present disclosure provides a method of treating an exhaust gas stream that includes receiving an exhaust gas stream from an engine adapted to combust both hydrocarbon fuel and hydrogen fuel. The exhaust gas received intermittently includes an exhaust gas produced by combusting the hydrogen fuel. The exhaust gas stream is passed through an oxidation catalyst article comprising an oxidation catalyst composition disposed on a substrate in fluid communication with the exhaust gas stream, which thus produces a first effluent. Optionally, the first effluent is then received into a selective catalytic reduction (SCR) article comprising at least one SCR composition disposed on a substrate downstream from the oxidation catalyst article. As noted above, in some embodiments, it is advantageous for the exhaust gas produced by combusting the hydrogen fuel to be received during a cold-start period, such as up to about 300 seconds after engine start-up.

The method of controlling hydrogen combustion can vary. In certain embodiments, an onboard controller may simply switch the engine to hydrogen combustion during a defined time period at engine start-up, such as the first 200 seconds or the first 300 seconds (i.e., a cold-start period). Alternatively, the controller will receive certain data from the treatment system that is used to determine the timing of hydrogen combustion. For example, one control system embodiment can receive oxidation catalyst unit inlet and outlet temperature data and control hydrogen combustion based on the temperature data. In some embodiments, hydrogen combustion will occur when the oxidation catalyst unit inlet temperature (i.e., the engine out exhaust gas temperature) is less than about 300° C. (e.g., less than about 275° C., less than about 250° C., or less than about 200° C.), and hydrogen combustion will stop when the oxidation catalyst unit outlet temperature is above about 300° C.

EXAMPLES

The use of hydrogen as a fuel during cold-start periods was compared to the use of hydrogen injection during cold-start periods as described in PCT International Application No. WO2018/185665. The comparison was made using a diesel vehicle simulator equipped with a DOC+SCR emission treatment system comprising a DOC catalyst article and an SCR flow-through catalyst article. Each catalyst component of the tested system is described below.

DOC Article

The DOC catalyst article was formed as follows. A bottom coat catalyst slurry containing milled alumina powder impregnated with Pd (0.5 wt. %), Ba (0.8 wt. %), and Pt (0.3 wt. %) was prepared and adjusted to a pH of 4.5 to 5.0 with nitric acid. The bottom coat slurry had a solid content of 38 wt. %. A top coat slurry containing alumina/5 wt. % Mn and Pt-amine (3.3 wt. %) was prepared, milled, and adjusted to a pH of 4.5 to 5.0 with nitric acid. The top coat slurry had a solid concentration of 37 wt. %. Zeolite beta (0.35 g/in$^3$) was added to the top coat slurry.

The bottom coat slurry was applied to the entire core length of a 1"×3". 400 cpsi (cells per square inch) honeycomb substrate via a washcoat technique. The coated substrate was air dried at 120° C. and calcined at 500° C. for 1 hour, providing a coating loading of 1.6 g/in$^3$. The top coat slurry was applied over the entire bottom coat and was dried and calcined as the bottom coat, to provide a total coating loading of 2.5 g/in$^3$ and a Pt/Pd weight ratio of 3/1.

SCR Article

A catalyst slurry containing milled CuCHA (3.3 wt. % Cu) and 5 wt. % zirconium acetate binder was prepared and applied via a washcoat technique to a 400 cpsi, 1"×5" flow-through honeycomb substrate having a volume of 64.4 cm$^3$. The coated core was dried at 130° C. and calcined at 550° C. for 1 hour to provide a coating loading of 2.85 g/in$^3$.

Example 1: H$_2$ Fuel Used During the Cold-Start Periods (0-200 and 0-300 Seconds)

Samples were evaluated in a lab reactor equipped to conduct a simulated NEDC (New European Driving Cycle) with a separate feed line for H$_2$/N$_2$ serving as the source for H$_2$ pulse, just in front of the DOC. Hydrogen was pulsed into the exhaust stream during the first 200 or 300 seconds with a hydrogen concentration in a feed gas of 1%. Hydrogen injection was performed via a separate (non-preheated) line in a H$_2$/N$_2$ feed gas. NH$_3$ was injected prior to the SCR catalyst at NH$_3$/NO$_x$ ratio of 1 on a second-by-second basis. The system was tested using 200 or 300 seconds of H$_2$ injection in front of the DOC. The system was also tested with the engine using H$_2$ fuel for 200 and 300 seconds before switching to diesel fuel (without H$_2$ injection in emission treatment system). To simplify the comparison between when H$_2$ was used as the fuel and when H$_2$ was injected in front of the DOC, the performance benefit was rooted to the reference (i.e., compared to the case when there is no H$_2$ involved, as 0%). Total hydrocarbon (THC) and carbon monoxide (CO) emissions were measured at the outlet of the DOC article for each test condition.

Figure 4:
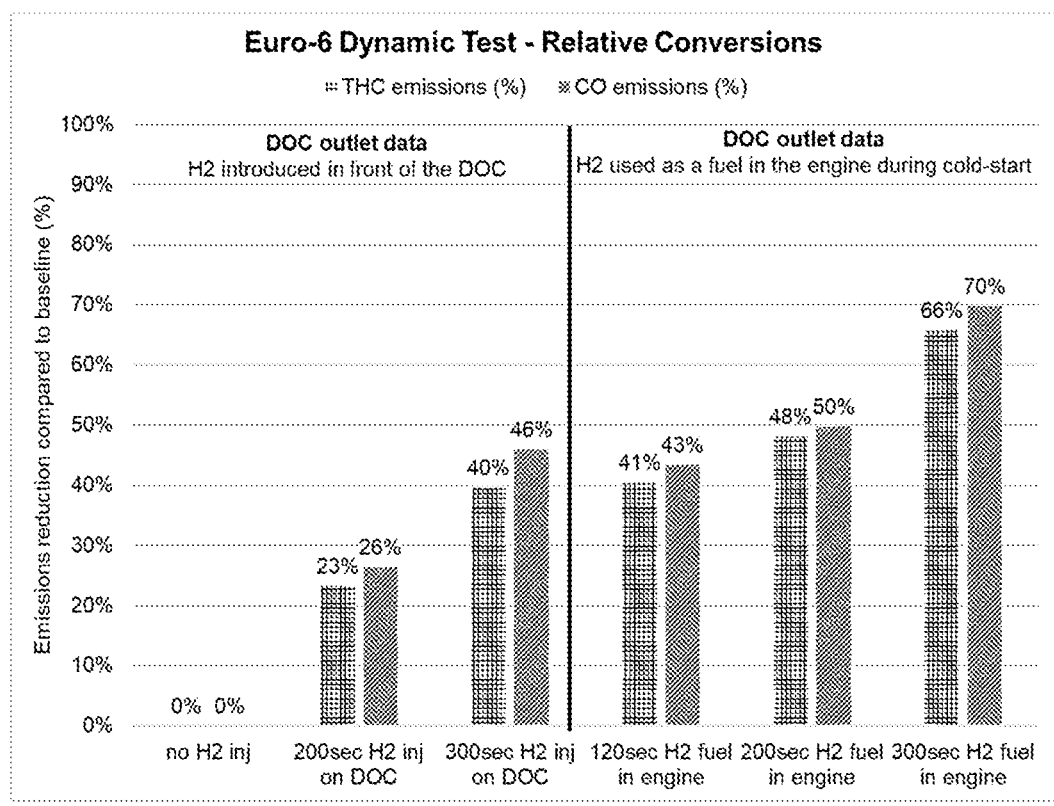
FIG. 4 graphically illustrates emission results associated with each experimental run described in Example 1, after the DOC catalyst, comparing injection of hydrogen in the emission treatment system with use of hydrogen as a fuel during a cold-start period.

The results are shown in FIG. 4. The results indicate that the use of H$_2$ either as a fuel or as a cold start performance enhancer is beneficial, and the use of H$_2$ as a fuel creates a greater advantage over the H$_2$ injection in front of the DOC. For example, the use of H$_2$ as a fuel during the cold start period for 200 seconds generates a 50% more conversion benefit for HC/CO performance, over the reference that uses the same aged catalyst without employing any H$_2$. This 50% conversion benefit is about twice the amount that could be obtained from the H$_2$ injection for the same time period on the DOC (23% and 26% for HC/CO, respectively).

Given the substantial benefits observed from using H$_2$ as the fuel, an additional run was conducted using a shorter time frame during the cold start period: 120 seconds instead of 200 seconds. As shown in FIG. 4, even with only 120 seconds of using H$_2$ as the fuel, a more than 40% HC/CO emission reduction over the reference can be observed, indicating that a lesser amount of H$_2$ fuel could be used and still be beneficial in helping to meet tighter regulations (such as, e.g., the Euro-7).

Figure 5:
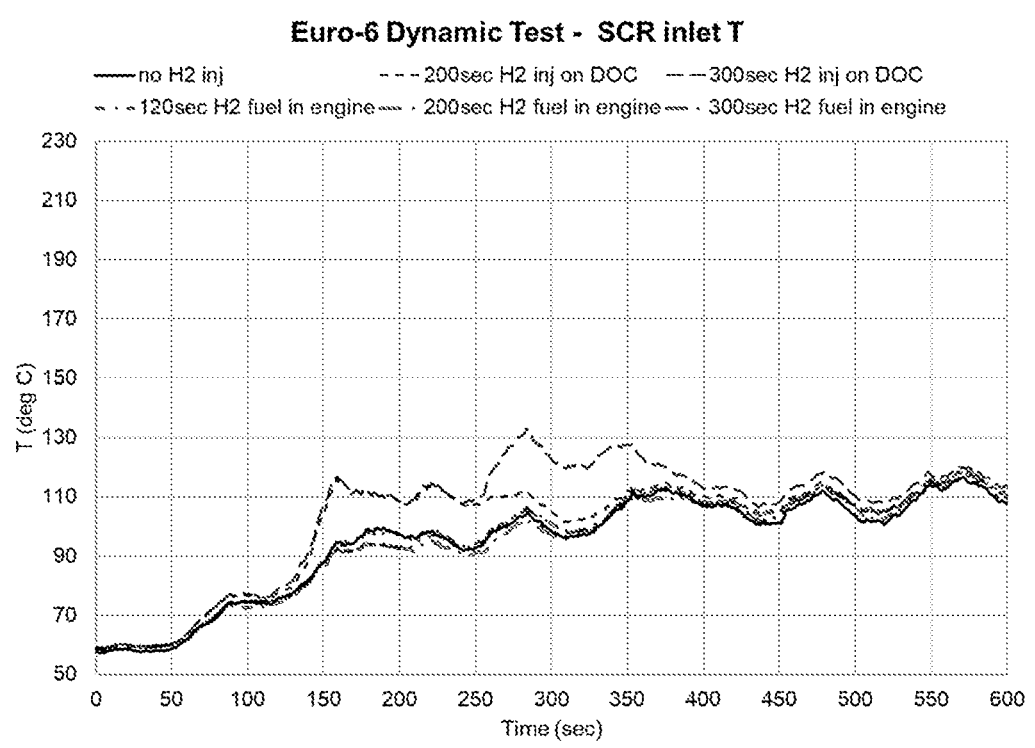
FIG. 5 graphically illustrates SCR inlet temperature for each experimental run described in Example 1.

When H$_2$ is used as fuel, there is no exotherm observed as in the case of direct H$_2$ injection on the DOC. Therefore, the SCR inlet temperature will be the same for those runs between using H$_2$ as the fuel and the reference (i.e., without any H$_2$ involvement), as shown in FIG. 5.

Figure 6:
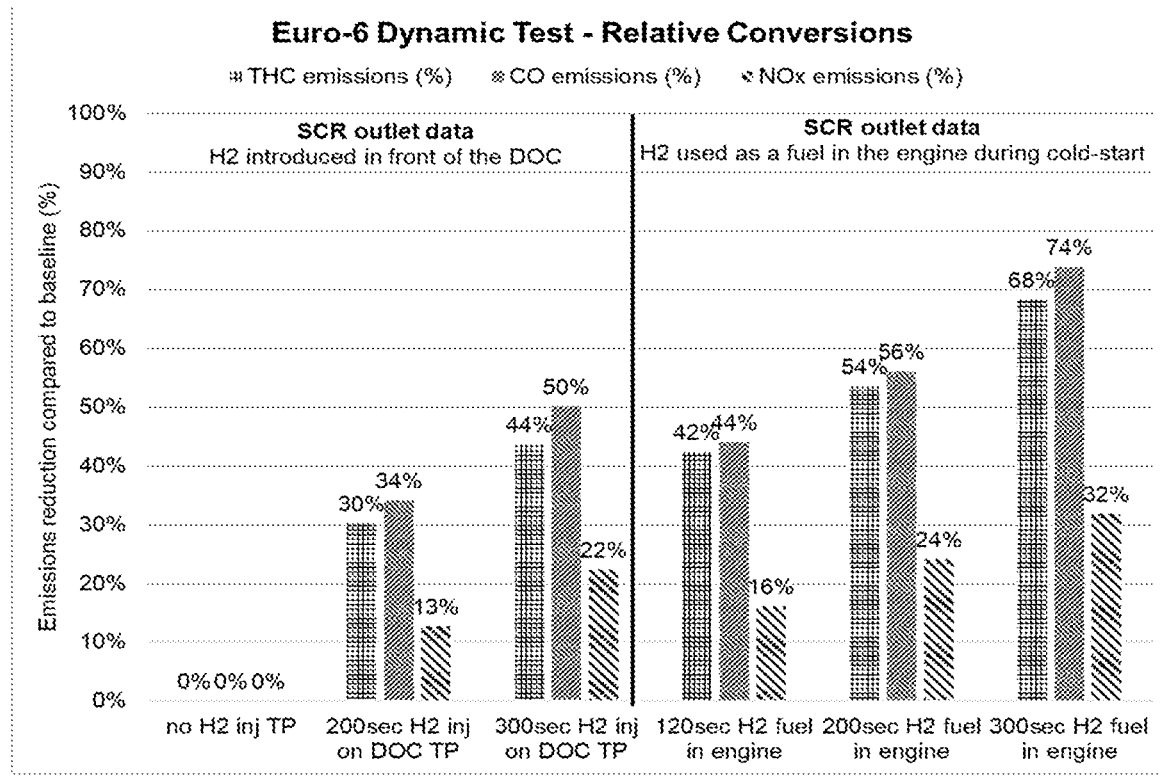
FIG. 6 graphically illustrates additional emission results associated with each experimental run described in Example 1, after the DOC+SCR catalyst system, comparing injection of hydrogen in the emission treatment system with use of hydrogen as a fuel during cold-start period.

NO$_x$ emissions from the SCR outlet were also measured for each run. Because of the lack of exotherm from the conversion of CO/HC in the exhaust gas when H$_2$ fuel was used, there is no temperature rising benefit for the downstream SCR function. However, as shown in FIG. 6, the total NO$_x$ performance when using H$_2$ as the fuel is still better than the system when H$_2$ injection in front of DOC protocol is being used, suggesting that residue CO/HC coming out of DOC degrades the NO$_x$ performance of the downstream SCR.

Again, the NO$_x$ conversion from the DOC+SCR system when H$_2$ fuel is used is almost twice as efficient as the system with H$_2$ injection (24% vs. 13% at 200 seconds and 32% vs. 22% at 300 seconds), and both systems are better than the reference. Even with a shorter period (120 seconds) when H$_2$ fuel is used, the NO$_x$ conversion is still 16% better than the reference, and 3% (16%-13%) better than the same system w % ben the H$_2$ injection duration is 200 seconds, more than 50% longer than the period when H$_2$ fuel is used.

Example 2: H$_2$ Fuel Used During the Cold Start Periods with a Lower Engine Out Temperature than the Conventional Engines As H$_2$ fuel has a lower latent heat energy than diesel, the inlet temperature of the DOC might not be the same as the traditional diesel engine (i.e., it should be lower), unless additional H$_2$ fuel (e.g., compressed H$_2$ feed) is used. Assuming one would not use additional H$_2$ fuel during the cold start, a run was conducted with a lower DOC inlet temperature to resemble the latent heat difference between diesel and H$_2$.

Figure 7:
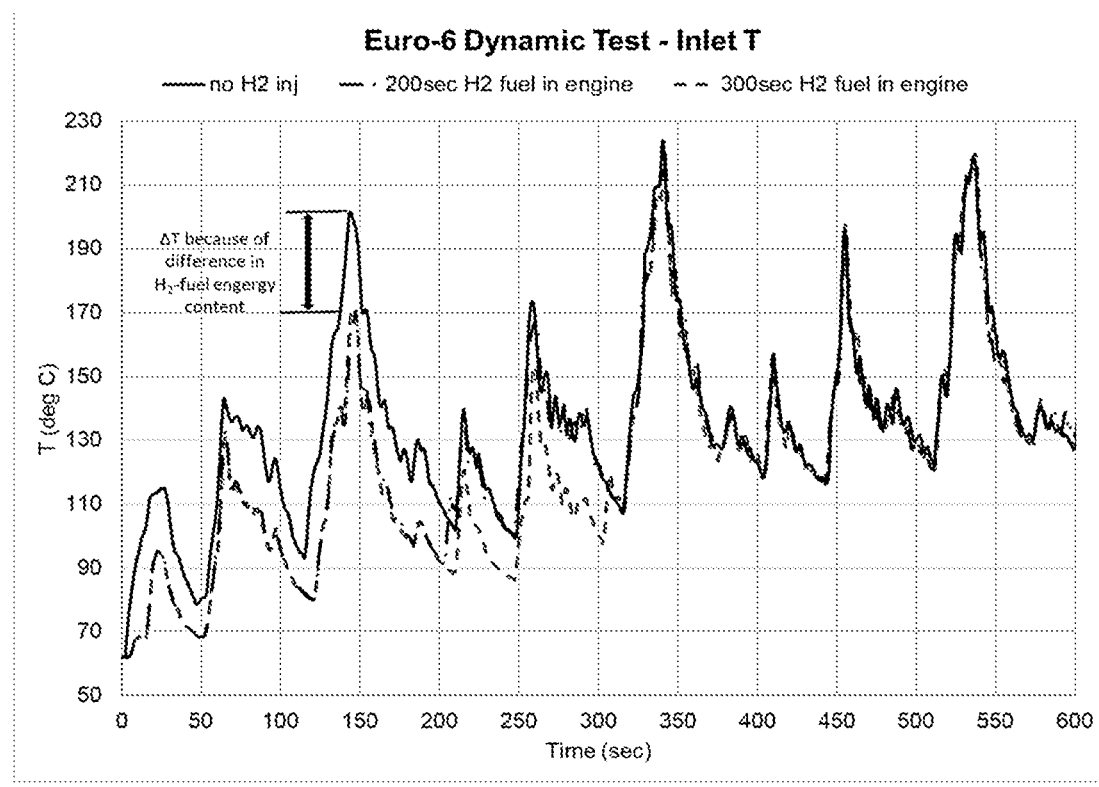
FIG. 7 graphically compares the emission treatment system inlet temperature for a conventional engine (no hydrogen fuel or hydrogen injection) with two examples of hydrogen used as a fuel during a cold-start period.
Figure 8:
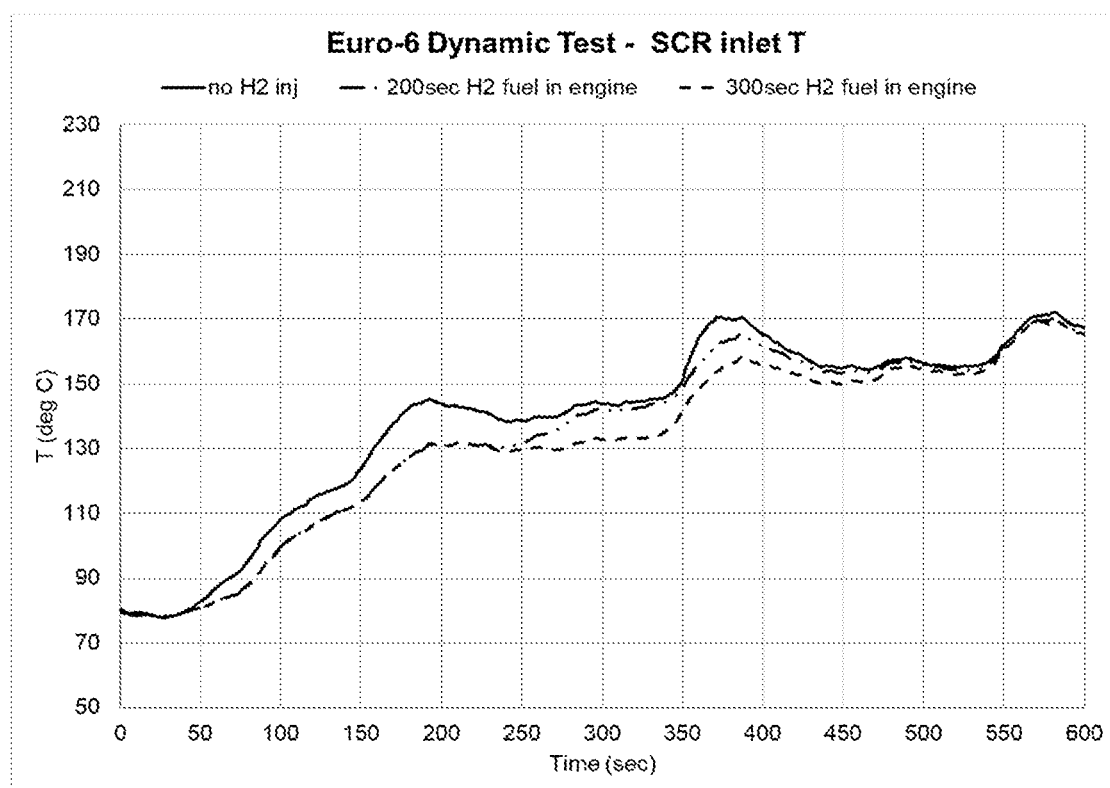
FIG. 8 graphically compares the SCR inlet temperature for a conventional engine (no hydrogen fuel or hydrogen injection) with two examples of hydrogen used as a fuel during a cold-start period.

Based on the volumetric heat value of hydrogen-air mixture (2.9 kJ/L) compared to conventional fuel (3.9 kJ/L), the exhaust temperatures trace for the DOC inlet temperature was modified accordingly. The resulting DOC and SCR inlet temperature traces for 200 second and 300 second hydrogen fuel scenarios are shown in FIGS. 7 and 8, respectively.

Figure 9:
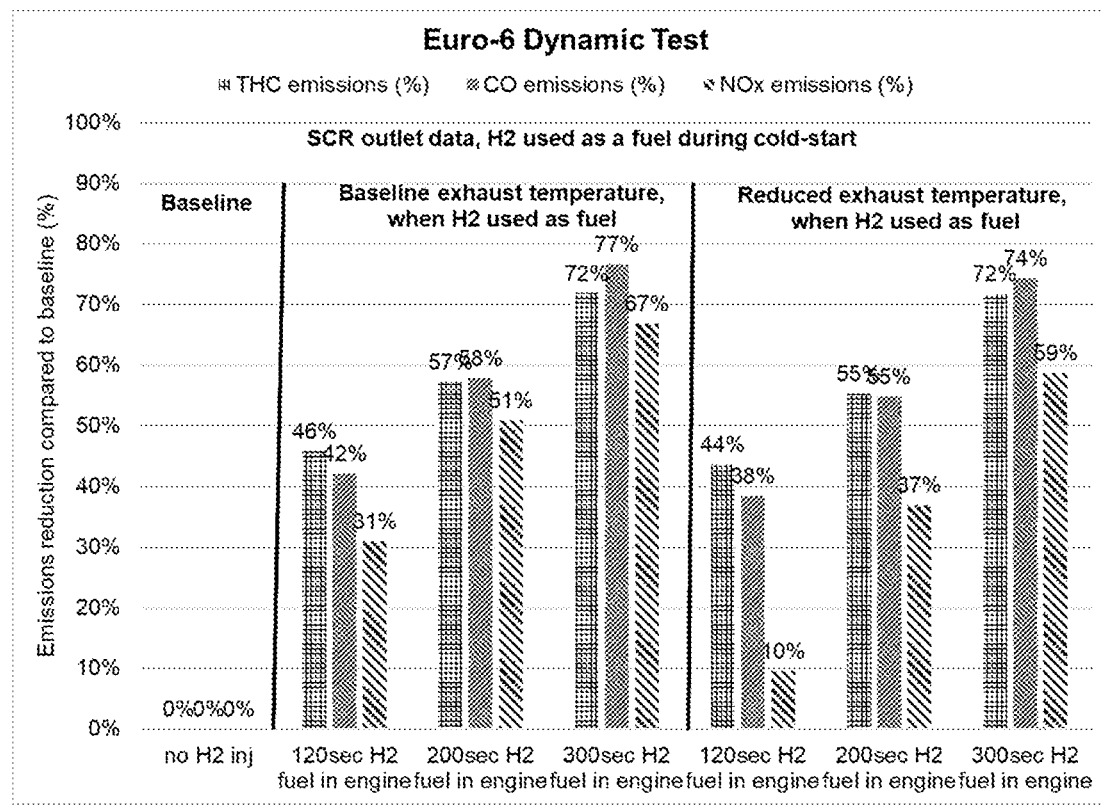
FIG. 9 graphically illustrates emission results associated with each experimental run described in Example 2, comparing use of hydrogen as a fuel during cold-start period at two different exhaust temperature conditions.

The same H$_2$ fuel runs were conducted at the lower inlet temperatures, and the results are shown in FIG. 9 in comparison to H$_2$ fuel runs at conventional engine out temperature. The results indicate a lower benefit observed compared to the runs with the same EO temperature trace as conventional engines. For example, the HC/CO conversion benefits drop 2% and 4% respectively, in 120 seconds use of the H$_2$ fuel, with a lower EO temperature. The greatest decrease in benefits is in NO reduction out of the SCR (from 31% to 10%), indicating the need for a quick heat-up on the SCR catalyst.

While the conversion benefit reductions can be observed due to a lower EO temperature, the conversion benefits over the reference case can still be noticed. The absolute values, as shown in FIG. 9, are still higher than in the case of using a $H_2$ injection in front of the DOC (see FIG. 6). For example, in the 200 second cold start period case, the HC/CO/NO conversion benefits for a lower EO temperature are 55%, 55%, and 37% respectively, for the case of $H_2$ as the fuel, versus 30%, 34%, and 13% respectively in the case of $H_2$ injection in front of the DOC (FIG. 6).

What is claimed is:

1. An emission treatment system for treatment of an exhaust gas stream emitted from an engine that combusts both hydrocarbon fuel and hydrogen, comprising:
    a diesel oxidation catalyst composition disposed on a substrate in fluid communication with an exhaust gas stream emitted from an engine that combusts both hydrocarbon fuel and hydrogen;
        at least one selective catalytic reduction (SCR) composition disposed on a substrate downstream from the diesel oxidation catalyst composition; and
        at least one three-way conversion (TWC) catalyst composition disposed on a substrate in fluid communication with the exhaust gas stream emitted from the engine that combusts both hydrocarbon fuel and hydrogen,
    wherein the engine is configured to combust hydrogen without combusting hydrocarbon during a cold-start period, and no hydrogen is injected downstream of the engine during the cold-start period.

2. The emission treatment system of claim 1, wherein the engine is configured for intermittent combustion of hydrogen.

3. The emission treatment system of claim 1, wherein the engine is configured to combust hydrogen during a cold-start period.

4. The emission treatment system of claim 3, wherein the cold-start period is either:
    (i) up to 300 seconds after engine start-up; or
    (ii) the time during which the engine out exhaust gas temperature is less than 300° C.

5. The emission treatment system of claim 1, wherein the engine is in fluid communication with a hydrocarbon fuel source and a hydrogen fuel source.

6. The emission treatment system of claim 5, wherein the hydrocarbon fuel source comprises a fuel selected from gasoline, diesel, and compressed natural gas.

7. The emission treatment system of claim 5, wherein the hydrogen fuel source comprises a hydrogen storage article, wherein the hydrogen storage article is in fluid communication with a water electrolyzer.

8. The emission treatment system of claim 1, wherein at least one of the diesel oxidation catalyst composition and the at least one TWC catalyst composition comprises at least one platinum group metal component dispersed on a refractory metal oxide support.

9. The emission treatment system of claim 8, wherein at least one of the diesel oxidation catalyst composition and the at least one TWC catalyst composition comprises at least one platinum group metal component in the range of 5 g/ft³ to 250 g/ft³, based on the volume of the substrate supporting the composition.

10. The emission treatment system of claim 1, wherein the substrate supporting the diesel oxidation catalyst composition or the at least one TWC catalyst composition is a flow-through monolith or a monolithic wall-flow filter.

11. The emission treatment system of claim 10, wherein the flow-through monolith comprises ceramic, metal, composite, fiber, or a combination thereof.

12. The emission treatment system of claim 1, wherein the substrate supporting the at least one SCR composition is a flow-through monolith or a monolithic wall-flow filter.

13. The emission treatment system of claim 1, wherein the at least one SCR composition is selected from a base metal-containing molecular sieve, a platinum group metal component dispersed on a refractory metal oxide support, and combinations thereof.

14. The emission treatment system of claim 1, wherein the at least one SCR composition is a base metal-containing molecular sieve that comprises copper and/or iron.

15. The emission treatment system of claim 1, wherein the at least one SCR composition is a molecular sieve that is either an 8-member ring or a 10-member ring small pore molecular sieve.

16. The emission treatment system of claim 1, wherein the at least one SCR composition is a molecular sieve that is a zeolite having a structure selected from AEI, AFT, AFX, CHA, EAB, ERI, FER, KFI, LEV, SAS, SAT, and SAV.

17. The emission treatment system of claim 1, wherein the at least one SCR composition is a molecular sieve that is an aluminosilicate zeolite having a CHA crystal structure and a silica-to-alumina ratio of from 1 to 1000.

18. The emission treatment system of claim 1, wherein the at least one SCR composition is a base metal-containing molecular sieve wherein the base metal is present in the molecular sieve from 0.1 wt. % to 10 wt. %, based on the total weight of the base metal-containing molecular sieve.

19. The emission treatment system of claim 13, wherein the at least one SCR catalyst composition comprises a platinum group metal component from 5 g/ft³ to 250 g/ft³, based on the volume of the substrate supporting the at least one SCR catalyst composition.

20. The emission treatment system of claim 1, wherein the system does not comprise any further emission treatment units within the emission treatment system aside from the diesel oxidation catalyst composition disposed on a substrate, the at least one selective catalytic reduction (SCR) composition disposed on a substrate and the at least one three-way conversion (TWC) catalyst composition.

21. The emission treatment system of claim 1, further comprising an injector upstream of and in fluid communication with the at least one selective catalytic reduction (SCR) composition and configured to introduce ammonia or an ammonia precursor upstream of the at least one selective catalytic reduction (SCR) composition.

22. A combustion system producing a treated exhaust stream, comprising:
    an engine adapted to combust a fuel source comprising a hydrocarbon fuel and a hydrogen fuel, and producing an exhaust gas stream;
    a hydrocarbon fuel source in fluid communication with the engine;
    a hydrogen fuel source in fluid communication with the engine;
    a diesel oxidation catalyst composition disposed on a substrate in fluid communication with the exhaust gas stream emitted from the engine;
        at least one selective catalytic reduction (SCR) composition disposed on a substrate downstream from the diesel oxidation catalyst composition; and
        at least one three-way conversion (TWC) catalyst composition disposed on a substrate in fluid communication with the exhaust gas stream emitted from the engine,
    wherein the engine is configured to combust hydrogen without combusting hydrocarbon during a cold-start period, and no hydrogen is injected downstream of the engine during the cold-start period.

23. The combustion system of claim 22, wherein the engine is configured for intermittent combustion of hydrogen.

24. The combustion system of claim 22, wherein the engine is configured to combust hydrogen during a cold-start period.

25. The combustion system of claim 24, wherein the cold-start period is either:
   (i) up to 300 seconds after engine start-up; or
   (ii) the time during which the engine out exhaust gas temperature is less than 300° C.

26. The combustion system of claim 22, wherein the hydrocarbon fuel source comprises a fuel selected from gasoline, diesel, and compressed natural gas.

27. The combustion system of claim 22, wherein the hydrogen fuel source comprises at least one component selected from a hydrogen storage article and a water electrolyzer.

28. The combustion system of claim 22, further comprising an injector upstream of and in fluid communication with the at least one selective catalytic reduction (SCR) composition and configured to introduce ammonia or an ammonia precursor upstream of the at least one selective catalytic reduction (SCR) composition.

29. A method of treating an exhaust gas stream, the method comprising:
   receiving an exhaust gas stream from an engine adapted to combust both hydrocarbon fuel and hydrogen fuel, wherein the receiving step comprises intermittently receiving an exhaust gas produced by combusting the hydrogen fuel;
   passing the exhaust gas stream through an oxidation catalyst article comprising a diesel oxidation catalyst composition disposed on a substrate in fluid communication with the exhaust gas stream to produce a first effluent;
   receiving the first effluent into a selective catalytic reduction (SCR) article comprising at least one SCR composition disposed on a substrate downstream from the oxidation catalyst article; and
   passing the exhaust gas stream through at least one three-way conversion (TWC) catalyst article comprising a three-way conversion catalyst composition disposed on a substrate in fluid communication with an exhaust gas stream;
   wherein the engine is configured to combust hydrogen without combusting hydrocarbon during a cold-start period, and no hydrogen is injected downstream of the engine during the cold-start period.

30. The method of claim 29, wherein intermittently receiving an exhaust gas produced by combusting the hydrogen fuel comprises receiving an exhaust gas produced by combusting the hydrogen fuel during a cold-start period.

31. The method of claim 30, wherein the cold-start period is either:
   (i) up to 300 seconds after engine start-up; or
   (ii) the time during which the engine out exhaust gas temperature is less than 300° C.

32. The method of claim 29, wherein the engine is in fluid communication with a hydrocarbon fuel source and a hydrogen fuel source.

33. The method of claim 32, wherein the hydrocarbon fuel source comprises a fuel selected from gasoline, diesel, and compressed natural gas.

34. The method of claim 32, wherein the hydrogen fuel source comprises a hydrogen storage article, wherein the hydrogen storage article is in fluid communication with a water electrolyzer.

35. The method of claim 34, further comprising forming hydrogen fuel through water electrolysis.

* * * * *